US007010500B2

(12) United States Patent
Aarnio

(10) Patent No.: US 7,010,500 B2
(45) Date of Patent: *Mar. 7, 2006

(54) ON-LINE SUBSCRIPTION METHOD

(75) Inventor: Ari Aarnio, Espoo (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 275 days.

(21) Appl. No.: 09/476,674

(22) Filed: Dec. 30, 1999

(65) Prior Publication Data

US 2004/0078274 A1    Apr. 22, 2004

(51) Int. Cl.
*G06F 17/60*    (2006.01)

(52) U.S. Cl. .............................. 705/26; 705/26; 705/14; 705/52; 380/247; 725/8

(58) Field of Classification Search .................... 705/26
See application file for complete search history.

(56) References Cited

U.S. PATENT DOCUMENTS

| 5,038,402 | A | * | 8/1991 | Robbins ...................... 725/144 |
| 5,303,393 | A | * | 4/1994 | Noreen et al. ............. 455/3.02 |
| 5,539,635 | A | * | 7/1996 | Larson, Jr. .................. 235/375 |
| 5,539,822 | A | * | 7/1996 | Lett ........................... 380/211 |
| 5,615,264 | A | * | 3/1997 | Kazmierczak et al. ........ 705/52 |
| 5,710,887 | A | * | 1/1998 | Chelliah et al. ............. 345/835 |
| 5,721,827 | A | * | 2/1998 | Logan et al. ............... 709/217 |
| 5,794,116 | A | * | 8/1998 | Matsuda et al. ............. 725/114 |
| 5,806,740 | A |   | 9/1998 | Carlson ...................... 224/628 |
| 5,819,160 | A | * | 10/1998 | Foladare et al. ......... 455/186.1 |
| 5,889,860 | A | * | 3/1999 | Eller et al. ................... 705/26 |
| 5,914,712 | A | * | 6/1999 | Sartain et al. ................. 725/1 |
| 5,914,941 | A |   | 6/1999 | Janky ......................... 370/313 |
| 5,956,716 | A |   | 9/1999 | Kenner et al. ................ 707/10 |
| 5,963,915 | A | * | 10/1999 | Kirsch ........................ 705/26 |
| 5,987,480 | A |   | 11/1999 | Donohue et al. ........... 707/501 |
| 6,009,401 | A | * | 12/1999 | Horstmann .................... 705/1 |
| 6,038,545 | A | * | 3/2000 | Mandeberg et al. ........ 345/723 |
| 6,118,493 | A | * | 9/2000 | Duhault et al. ............. 348/564 |
| 6,119,098 | A | * | 9/2000 | Guyot et al. ................ 705/10 |

(Continued)

FOREIGN PATENT DOCUMENTS

WO    WO 99/18518    *    4/1999

OTHER PUBLICATIONS

Curran, L. J. "Satellite radio: Along for the ride," Electronic Business, vol. 24, No. 8 (Aug. 1998).*

(Continued)

*Primary Examiner*—Jeffrey A. Smith
*Assistant Examiner*—Timothy M. Brown
(74) *Attorney, Agent, or Firm*—Cohen, Pontani. Lieberman & Pavane

(57) ABSTRACT

A system and a method of providing on-line subscription services from a subscription server to a user of a mobile terminal through the Internet. The subscription server receives from the mobile terminal user-specific information relating to the user's mobile terminal capabilities, the user's preferences of products, and the user's financial information. The subscription server sends to the mobile terminal at least locally or remotely retrieved information related to a product based on the user-specific information. The subscription server receives from the mobile terminal a request indicating whether the user wishes to either cancel or purchase the product. The subscription server cancels the product when the user indicates so, and downloads the product to the mobile terminal when the user desires to purchase the product.

1 Claim, 3 Drawing Sheets

U.S. PATENT DOCUMENTS

| | | | |
|---|---|---|---|
| 6,122,263 A * | 9/2000 | Dahlin et al. | 370/329 |
| 6,205,485 B1 * | 3/2001 | Kikinis | 709/231 |
| 6,212,359 B1 * | 4/2001 | Knox | 725/1 |
| 6,233,682 B1 * | 5/2001 | Fritsch | 705/26 |
| 6,369,908 B1 * | 4/2002 | Frey et al. | 358/1.15 |
| 6,385,596 B1 * | 5/2002 | Wiser et al. | 369/84 |

OTHER PUBLICATIONS

Kirkpatrick, J. "Cars' Satellite Radio Coming, But at a Cost 2 Companies to Offer Up to 100 Channels," Record (Aug. 21, 1998).*

Lambert, P. "FCC puts satellite DAB plan up for comment," Broadcasting, vol. 122, No. 43 (Oct. 19, 1992) p. 28.*

Grundig: DAB—Just another gimmick or a real benefit to the (in-car) consumer?, M2 Presswire (Jul. 17, 1997).*

"Technology Giants Join Forces with New Jersey Firms on Internet Telephony," Star Ledger (Mar. 12, 1999).*

"Japanese Copyright Groups to Seek Higher Fees on DAB," Audio Week, vol. 5, No. 37 (Sep. 27, 1993).*

"Widespread DAB Acceptance 'Probable,' Public Radio Survey Says," Audio Week, vol. 5, No. 22 (Jun. 7, 1993).*

Scully, V. "The five vying for digital audio radio service," Broadcasting & Cable, vol. 123, No. 16 (Apr. 19, 1993) p. 54.*

Hogan, M. "Satellite Radio Start-Ups Seek Subscribers," Multichannel News, vol. 20, No. 26 (Jun. 21, 1999) p. 50.*

Doward, J. "Media: Radio's DAB hands tune in for a revolution: Digital audio broadcasting is riding on the crest of a wave to a new wireless medium, says Jamie Doward," Observer (Aug. 3, 1997) p. 5.*

Farhi, P. "Music from the Spheres; Two Local Companies Go Head to head to Develop Pay Satellite Radio," The Washington Post, (May 19, 1997).*

Trachteberg, J.A. "Here We Go Again" Forbes, vol. 136, No. 108 (Aug. 26, 1985).*

"Viewer's Choice to begin on Nove. 27" PR Newswire (Nov. 26, 1985).*

Ericsson Supports Broad Range of WAP-Applications Business Wire (Jun. 23, 1999).*

"Hand-Held Devices Ripe for Limited Web Purchasing" Multimedia Week, vol. 8, No. 22 (Jun. 7, 1999).*

AT&T Launches Digital PCS Personal News; Customized news, Weather, Sports and More Sent Directly to AT&T Wireless Customers' Digital PCS Phones Business Wire (Aug. 3, 1999) p. 0013.*

"Blue Tooth Technology" By Terry Christopher, e-Journal Magazine—Blue Tooth, http://www.e-journalmag.com/html/blue_tooth.html.

* cited by examiner

ON-LINE SUBSCRIPTION METHOD

BACKGROUND OF THE INVENTION

1. Field of the Invention

The present invention relates to the provision of services over a wide-area network and, more particularly, to a system and a method of providing audio and/or video data to a subscriber using a wide-area network such as the Internet.

2. Description of the Related Art

In order to receive the newest and latest entertainment or informational products such as books, music compact disks (CD's), or movie tapes on a regular basis, consumers are often required to join various clubs such as a book club, a CD club, and/or a movie club. These clubs send periodically, typically on a monthly basis, a preselected number of books, CDs, or movies to their members. Delivery of these products by mail or similar services is usually relatively slow so the members do not necessarily receive the most current products. Also, when customers choose not to buy these products, the overall costs of providing the service increase, which inevitably raise the price of these products.

With the advent of the Internet, there is now available on the World Wide Web a multitude of entertainment/informational resources readily accessible by the consumers. To retrieve such products, the consumers employ browsers installed on their desktop computers to search and identify the appropriate Web sites containing the desired products.

Now, users of mobile equipment such as wireless phones and palm-sized personal computers also demand, as do users of desktop computers, these same products. However, searching and browsing such information using mobile equipment may not be practical, as such mobile equipment has limited processing capability, memory, and battery power. In addition, such mobile equipment has small displays for viewing and manipulating information.

U.S. Pat. No. 5,914,941 discloses a portable digital device for storing audio information on a hard drive, in a flash EPROM, or other solid state non-volatile memory. The device may be connected to an ISDN telephone, a digital satellite broadcast device, a two-way interactive cable device, or an Internet Service Provider. However, there is no disclosure of a system for distributing information to subscribers automatically and periodically or a system for distributing text and audio-video data customized for a particular user on a subscription basis over a wireless communication network.

Accordingly, there is a need for a system and method for providing consumers entertainment and informational products, tailored to their preferences and interests, on a regular basis through a wide-area network and a wireless communication network.

SUMMARY OF THE INVENTION

An object of the present invention is to provide a system and a method for distributing audio-video data from a database to a subscriber automatically and periodically using a wide-area network and a wireless communication network.

According to an aspect of the invention, the system includes a mobile terminal and a server that can access data representing audio-video information and/or text desired by a subscriber. The server can also access data relating to the capabilities of the mobile terminal, and preferences and financial information of a subscriber so that the desired data or product may be downloaded to the mobile terminal automatically and periodically. The server charges the subscriber an agreed sum for the downloaded product.

According to another aspect of the invention, the subscription server periodically sends to the mobile terminal information concerning products available for downloading. The subscriber may reply by sending a response through the mobile terminal indicating whether the subscriber wishes to receive the products. The response may be formatted as a Short Message Service (SMS) message or an e-mail to the subscription server. If the subscriber accepts and specifies a product, the server downloads the specified product to the mobile terminal. If the subscriber does not accept any of the products, the subscriber sends a cancellation message to the subscription server; the subscriber may optionally place a voice call to the operator of the subscription server.

In one embodiment, a subscription server provides online subscription services to a user of a mobile terminal through the Internet. The mobile terminal transmits to the subscription server user-specific information relating to at least one of the user's mobile terminal capabilities, the user's preferences of products, and information relating to the user. The subscription server receives the user-specific information relating to the at least one of the user's mobile terminal capabilities, the user's preferences of products, and information relating to the user. The subscription server sends to the mobile terminal at predetermined time intervals, in response to user-specific information relating to at least one of the user's mobile terminal capabilities and the user's preferences of products and the information relating to the user, information related to a product when the user is authorized to receive the product based on the user-specific information received from the mobile terminal. The subscription server receives from the mobile terminal a request indicating whether the user wishes to receive or not receive the product. The subscription server transmits the product in digital form to the mobile terminal when the user indicates a desire to receive the product.

In another embodiment, the entire product (e.g., book, music, etc.) is downloaded to customers' mobile terminals, including a special "gateway lock". The customer can, for example, read the first page of the downloaded book, or listen to one-minute of the downloaded music etc. and after that the "gateway lock" prohibits the use of the product and the user must choose whether to buy the product or not. If the answer is "yes", the "gateway lock" opens and the rest of the downloaded product can be accessed by the customer and fees are charges according to the terms of an agreement or club rules already agreed to by the customer. This embodiment has the advantage of lower overall costs. One possibility is that the product is sent back to the server so that the server knows that the subscription is cancelled.

Routing of data packets between a sender (e.g., the subscription server) and a receiver (e.g., a mobile terminal) is described in U.S. Pat. No. 6,233,458, which is incorporated herein by reference.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE CURRENTLY PREFERRED EMBODIMENTS

Figure 1:
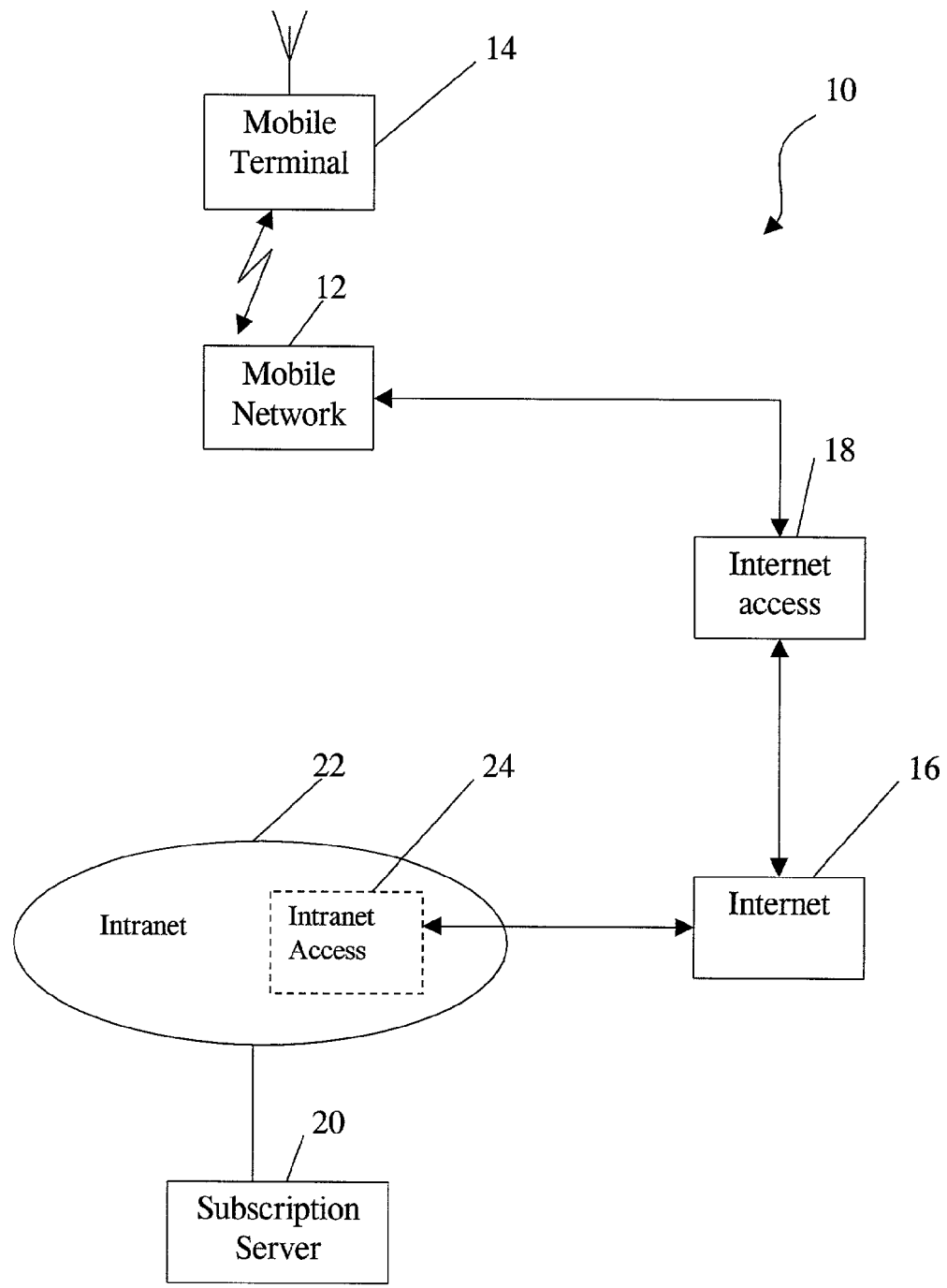
FIG. 1 illustrates an on-line subscription system using a wide-area network in accordance with an embodiment of the present invention.

FIG. 1 illustrates an on-line subscription system 10 in accordance with an embodiment of the present invention. The system 10 includes a mobile or a wireless communication network 12 for communicating with a mobile terminal 14 comprising, for example, a palm-sized personal computer, a Personal Digital Assistant, and a wireless phone. The wireless communication network 12 is connected to a wide area network such as the Internet 16 through an Internet access 18 such as a gateway server. Advantageously, the system 10 includes a subscription server 20, connected directly to an Intranet 22, and indirectly to Internet 16 through an Intranet access 24, for automatically and regularly communicating data to a subscriber, i.e., a user who is registered with the subscription server 20. A user is registered when the user submits to the subscription server 20 the requisite user-specific information, which will be stored in a subscription database accessible by the subscription server 20. The user-specific information includes the capabilities of the user's hardware, the user's financial information, and the user's preferences. Information on the user's hardware capabilities (e.g., user agent, terminal type, network type etc.) enables the server to download data in a format compatible with the mobile terminal's protocol and the user network's protocol. The user's financial information such as, for example, the user's name, address, bank, credit or debit card account and other requisite billing information is included so that fees can be charged against the user's account as appropriate. As one example, the user's preferences are included so that the subscription server 20 can automatically seek out and retrieve digitally-formatted products preferred by or otherwise interesting to the user (e.g., works of favorite writers, composers, singers, artists, music bands, orchestras, etc.) locally or from other vendor servers connected to the Internet for transmission to the user's mobile terminal using, for example, a search engine.

Figure 2:
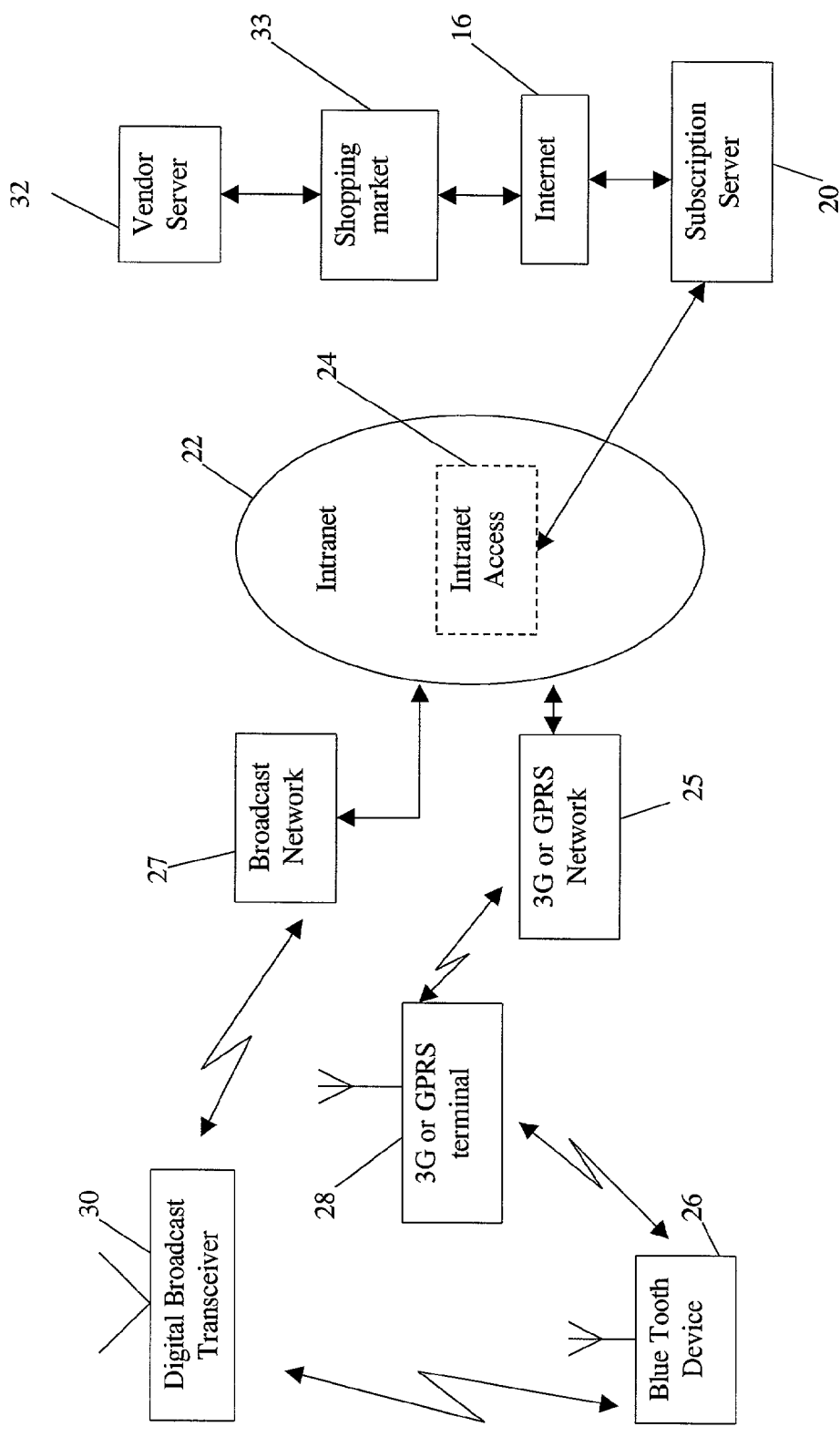
FIG. 2 depicts another embodiment of the on-line subscription system of the present invention.

FIG. 2 illustrates another embodiment of the inventive on-line subscription system 10. The mobile terminal 14 includes a Bluetooth-capable transceiver configured to communicate wirelessly using Bluetooth technology (i.e., using low power RF link) with a Bluetooth-compliant device 26 such as, for example, an electronic book ("e-book"), an audio player, or a multimedia player for displaying or playing audio-visual information. The Bluetooth-capable transceiver may for example be a digital broadcast transceiver 30 for communication with a broadcast network 27 or a third generation General Packet Radio Service (3G or GPRS) terminal 28 for communication with a 3G GPRS network 25. The Bluetooth-capable transceiver is a device that operates at a radio frequency of about 2.4 GHz and is capable of establishing radio links with other compliant devices within a predetermined distance of each other (e.g., typically less than about 30 feet). Thus, user of the transceiver 26 may move about a facility, but still maintain access to the user's e-mail, contacts, or appointments through a Local Area Network (LAN). If unable to display or play the downloaded product from the subscription server 20, the Bluetooth-capable transceiver may store the downloaded product and then transfer (e.g., using wireless or wireline devices) the downloaded product to, for example, the electronic book 26 (or a laptop computer) for presentation, e.g., viewing and/or listening.

The subscription server 20 may access data or product from a local database or from a vendor server 32 (operated by, for example, a book publisher) connected to the Internet. In the case where direct access to the vendor server 32 is required, the subscription server 20 sends a Uniform Resource Locator (URL) message (a conventional method of locating or retrieving resources from the World Wide Web) addressed to the vendor server 32 and retrieves the desired data from the vendor server 32. Optionally, the subscription server 20 sends a URL message to a "shopping market" 33 Web site which then redirects the subscription server 20 to other vendor Web sites (e.g., various book publisher's servers) to retrieve the product which has been determined to be interesting to the user by using the user's preferences. It is not necessary that user preferences determine when and what information is sent but the book club (or the subscription server 20) itself can decide what and when should be sent depending on the collection of items the book club is interested in. The user preferences may, for example, be a predetermined time period (e.g., once a month) the product is transmitted to the user. For example, for an electronic book club, the text of one or more books is transmitted on the first of each month by the subscription server 20 and downloaded into the mobile terminal 14.

Figure 3:
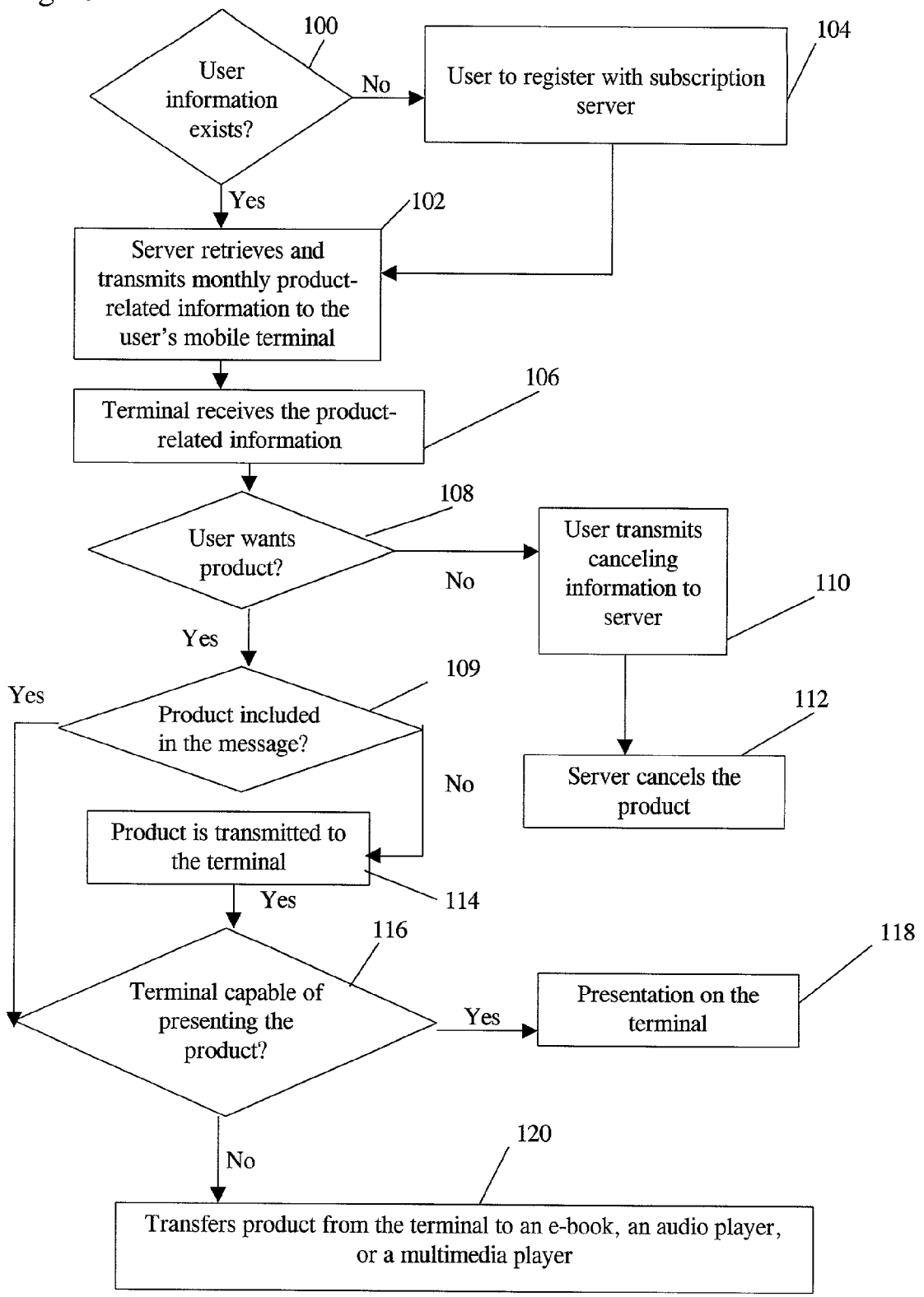
FIG. 3 is a flow chart describing an embodiment of the inventive method.

FIG. 3 is a flowchart describing an embodiment of the on-line subscription method of the present invention. Initially, in step 100, the subscription server 20 determines whether user-specific information for a user exists. In step 102, if the user-specific information exists (or if the user is authorized to receive information from the subscription server 20), the subscription server 20 retrieves (locally, or remotely from a vendor server by, for example, sending a URL request) and transmits to the mobile terminal 14 information relating to available products at each predetermined period of time. The products are selected based on the user's preferences obtained from the previously submitted user-specific information. If user-specific information does not exist for the user (or the user is not authorized to receive information from the subscription server 20), that user must register with the subscription server 20 and supply the requisite information before he can receive product-related information from the subscription server 20, as indicated in step 104. In step 106, the subscription server 20 assesses and sends to the mobile terminal 14 the product-related information. In step 108, the user determines whether to purchase a product (e.g., MP3 (MPEG, layer 3) coded music data and/or JPEG coded image data etc.) based on the product-related information. If not, the user sends a cancellation request from the mobile terminal 14 to the subscription server 20 in step 110. The subscription server 20 then cancels the product in step 112. The cancellation message may be sent to a special address specified in the message sent. When the server 20 receives the message, it will add a cancellation mark to the subscriber information. In step 109, it is determined whether the product is included in the message. If the product is included in the message, the method jumps to step 116. If the product is not included in the message, the subscription server 20 retrieves and transmits (i.e., downloads) the product to the mobile terminal 14 in step 114 based on the network capabilities specified by the user. The mobile terminal 14 then determines whether the mobile terminal 14 is capable of presenting the product based on the user-specific information in step 116. If so, the mobile terminal 14 receives and presents the product by, for example, using an MP3 player to convert the product into sounds which are played on a speaker in step 118. If not, the mobile terminal 14 transfers the product to a Bluetooth-capable player 26 such as, for example, an electronic book, an audio player, and/or a multimedia player etc. in step 120. In the case where text and/or JPEG image data are transferred to the electronic book 26, the user may view one or more pages on the electronic book 26 as the user depresses sequentially a signaling switch thereon to cause transfer of additional data for display thereon. Thereafter, the subscription server 20 charges the user's credit or debit card account the price of the downloaded product.

In another embodiment, the entire product (e.g., book, music, etc.) is downloaded to customers' mobile terminals, including a special "gateway lock". The customer can, for example, read the first page of the downloaded book, or listen to one minute of the downloaded music etc. and after that the "gateway lock" prohibits the use of the product and the user is requested to decide whether to buy the product or not. If the answer is "yes", the "gateway lock" opens (by, for example, a decoding message or instruction from the subscription server 20) and the rest of the downloaded product can then be accessed by the customer and fees are charged according to the terms of an agreement or club rules already agreed to by the customer. This embodiment has the advantage of lower overall costs. It is contemplated that instead of canceling the product, the product may be sent back to the server so that the server knows that the subscription is cancelled. It is also contemplated that instead of sending a decoding message back from the server, the downloaded product includes an access code for unlocking the gateway lock so that the customer can access the entire product.

The steps of this embodiment include the following. The mobile terminal 14 receives a free sample (e.g., a portion of a book or a musical piece) and displays or plays the free sample to the customer. After displaying the free sample (of predetermined length), the customer is asked whether he or she wants to continue. If the customer indicates a desire to continue, the mobile terminal clears the gateway lock so that the customer can continue his or her enjoyment of the product and the requisite fees are displayed to the customer and charged to the customer's account.

In still another embodiment, the subscription server 20 transmits offers to select mobile terminals of non-members (i.e., those who have not yet registered with the subscription server 20) inviting the non-members to register with the subscription server 20 (e.g., to join a book club). The offers may include free downloads of contents (e.g., books, music, etc.). Preferably, the non-members may select one or more free downloads from a predetermined list—only upon acceptance of the offer to register with the subscription server 20. Thereafter, the new member user receives messages (such as, for example, newsletters, samples, and other offers) from the subscription server 20 periodically (e.g., monthly).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of providing an electronic "book-of-the-month" subscription service to a user of a cellular telephone on a cellular telephone network, comprising the steps of:

subscribing, by the user, to the on-line subscription service by interacting with a subscription server on the Internet, wherein said step of subscribing comprises the sub-step of:

transmitting user-specific information provided by the user to the subscription server which stores the user-specific information, wherein the user-specific information comprises at least one of the capabilities of said cellular telephone, the preferences of the user, and other information related to the user;

transmitting to the cellular telephone via the cellular telephone network at predetermined time intervals and without user action offers to download a digitally formatted electronic text, wherein each offer is transmitted with at least a portion of the digitally formatted electronic text being offered, wherein the user can access a preview portion of the at least a portion of the digitally formatted electronic text using the cellular telephone, and wherein the offer to download the digitally formatted electronic text is sent to the user if the digitally formatted electronic text corresponds to the user-specific information stored at the subscription server;

transmitting from the cellular telephone via the cellular telephone network a response indicating whether the user wishes to accept the offer to download the digitally formatted electronic text; and if the transmitted at least a portion of the digitally formatted electronic text does not comprise the entire digitally formatted electronic text and the user indicates a desire to purchase the digitally formatted electronic text, the step of:

transmitting the remaining portion of the digitally formatted electronic text to the cellular telephone; or if the transmitted at least a portion of the digitally formatted electronic text comprises the entire digitally formatted electronic text and the user indicates a desire to purchase the digitally formatted electronic text, the step of:

transmitting a decoding message to the cellular telephone, wherein said decoding message is for unlocking a gateway lock which prevents the user from accessing more than the preview portion of the entire digitally formatted electronic text.

* * * * *